Oct. 29, 1957     J. CHIN     2,810,988
METHOD OF SPROUTING BEANS
Filed Sept. 17, 1954
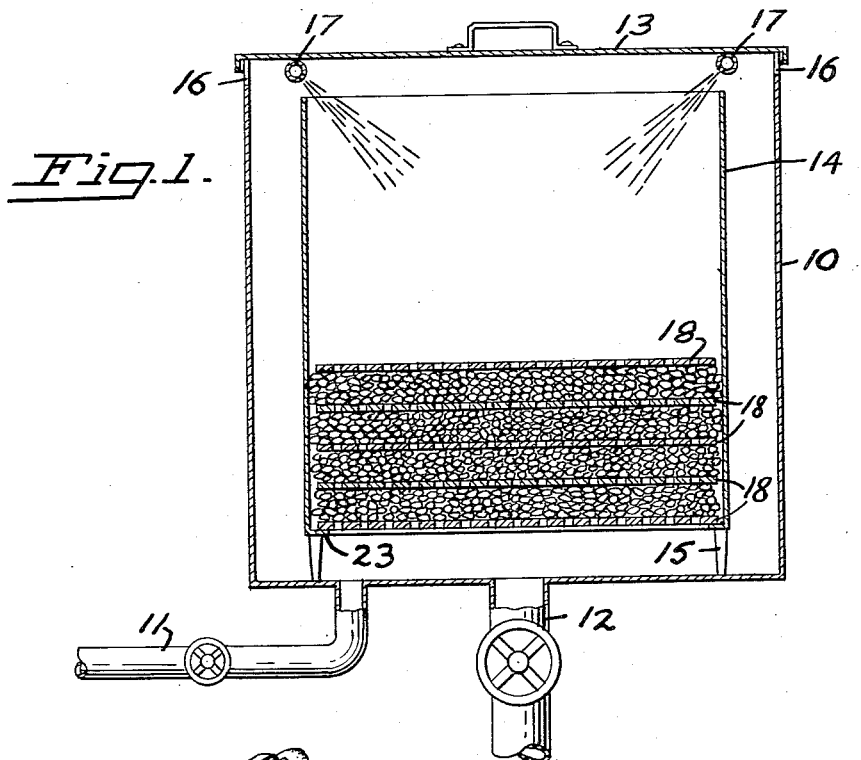
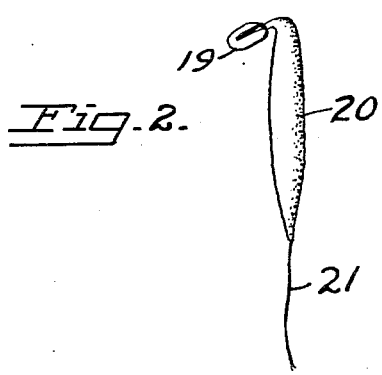
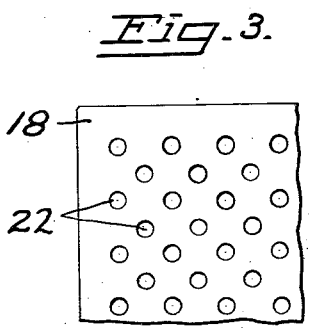
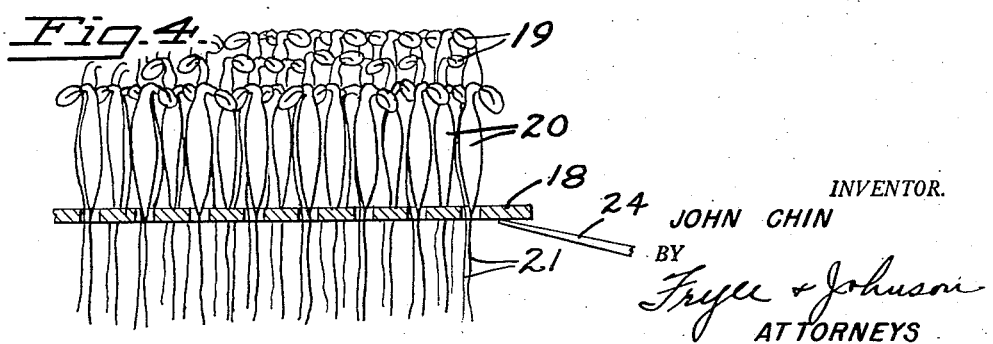
INVENTOR.
JOHN CHIN
BY
Fryer & Johnson
ATTORNEYS United States Patent Office 2,810,988
Patented Oct. 29, 1957

2,810,988
METHOD OF SPROUTING BEANS
John Chin, San Francisco, Calif.
Application September 17, 1954, Serial No. 456,732
1 Claim. (Cl. 47—14)

This invention relates to bean sprouting methods, particularly a method of using the type of machine disclosed in my co-pending application entitled "Controls for Bean Sprouting Machines," filed September 21, 1953, Serial No. 381,357, now Patent 2,750,713.

In the production of edible root sprouts referred to herein as "bean sprouts," the seed or beans are placed in an atmosphere of controlled moisture and temperature until they germinate and produce a sprout of the desired size. The criteria of excellence in the final product are a thick succulent sprout, absence of hulls or shells in the bean and a minimum of the tentacle-like processes commonly referred to as roots which grow from the end of the larger edible sprout portion.

The size and quality of the edible sprout portion are obtained by the control of moisture and temperature as described in my co-pending application referred to above and it is to be understood that the same or similar principles of control may be employed in connection with the present invention though they are not disclosed herein.

The bean shells are satisfactorily separated from the sprouts by a washing and tumbling process. The removal of the tentacle-like portion or root of the sprout has, however, presented a problem because it has heretofore been accomplished by the tedious procedure of holding a small bunch of sprouts in the hand and separating the roots therefrom with scissors or similar instruments.

It is the object of the present invention to provide a method and apparatus for growing bean sprouts which greatly facilitates the removal of the root portions therefrom and insures the separation of a very high percentage of said portions.

Further objects and advantages of the invention and the manner in which it is carried into practice are made apparent in the following specification where reference is made to the accompanying drawing illustrating the apparatus and method of the present invention.

In the drawing:

Fig. 1 is a schematic view in vertical section of a bean sprouting machine embodying the present invention, Fig. 2 is a view in elevation illustrating a bean after it has sprouted, Fig. 3 is a fragmentary plan view showing the details of a perforated shelf, several of which are shown in Fig. 1, and Fig. 4 is a fragmentary section through a portion of such a shelf with sprouted beans supported thereby.

In Fig. 1, a housing 10 is shown as provided with a valved water inlet 11 and a valved water outlet 12, both arranged in the bottom of the housing. A cover 13 closes the top of the housing and a container 14 for beans to be sprouted is disposed within the housing and supported in spaced relation to the bottom of the housing as by legs 15. The container 14 is somewhat smaller than the housing to provide space for the circulation of air which may enter as through openings 16 to control the temperature within the housing. Nozzle pipes 17 may also be employed for directing water in a spray over the top of the beans in the container 14.

Beans to be sprouted are placed in the container 14 and covered with water which is admitted through the inlet pipe 11 periodically and discharged through the pipe 12 so that the beans are only temporarily immersed at properly timed intervals. Automatic controls for the admission and discharge of such water, as well as for the temperature within the housing may, of course, be provided but do not constitute a part of the present invention.

It has been common practice to support the entire mass of beans within the housing on a screen or perforate surface but the present invention contemplates the use of a plurality of plate or shelf-like members shown at 18 spaced vertically at regular intervals throughout the mass of beans in the container 14. The purpose of these shelves 18 is to permit the beans above them to sprout with their root portions projecting through the perforations in the shelf where they may be conveniently removed. For an understanding of this method, reference is made to Fig. 2 in which the shell of a bean which has sprouted is indicated at 19 as having a sprout 20 thereon and the hair-like terminal end thereof referred to herein as a root 21. It is the nature of the sprout 20 and root 21 to progress downwardly in growth and in accordance with the present invention, only sufficient beans are placed on top of each shelf 18 to permit substantially all of the roots 21 to extend downwardly through perforations 22 in the shelf; the result being somewhat as illustrated in Fig. 4 when the beans have sprouted.

The lowermost of the shelves 18 is supported on a flange 23 of the container 14 and each of the other shelves is supported only by the beans beneath it. The beans of course expand during the sprouting process and because of this manner of supporting the shelves, they are free to separate with respect to each other and to move upwardly during the growth of the sprouts. The quantity of beans placed between the shelves in charging the container 14 must be determined by the amount of growth and expansion anticipated. In practice, it has been found that a layer of beans of about ¾ of an inch in thickness between each two of the shelves 18 will expand to approximately 3 inches and that under these conditions, most, if not all, of the roots 21 will find their way through perforations in the shelf beneath them. When the sprouts have obtained their desired growth, the shelves 18 are removed one at a time from the container 14 so that each shelf with the beans supported by it has the appearance illustrated in Fig. 4. Upon removal of the shelf, a knife or flat bladed instrument is placed in the position illustrated at 24 in Fig. 4 and is advanced across the under side of the shelf to shear the protruding roots 21. This greatly simplifies the removal of the roots from the sprouts and insures a high percentage of separation compared to methods previously known.

I claim:

The method of sprouting beans and separating the root portions from the sprouts which comprises starting a mass of beans to sprout with horizontally disposed vertically spaced perforate plates arranged in the mass to separate it into layers of a thickness in which roots from substantially all the sprouts in a layer may extend downwardly through the perforate plate beneath the layer, permitting the sprouts to mature with the roots from each layer extending downwardly through the perforations in the plate, then removing the plates from the mass one at a time and shearing the roots from beneath the plate before removing the sprouts.

References Cited in the file of this patent
UNITED STATES PATENTS

| 2,177,422 | Swaney | Oct. 24, 1939 |
| 2,296,849 | Hammerstrom | Sept. 29, 1942 |
| 2,436,652 | Lee | Feb. 24, 1948 |

FOREIGN PATENTS

| 24,939 | Australia | of 1935 |
| 498,612 | Belgium | Oct. 31, 1950 |
| 551,081 | France | Dec. 26, 1922 |
| 1,066,645 | France | Jan. 20, 1954 |
| 468,056 | Great Britain | 1937 |